United States Patent
Tomido et al.

(10) Patent No.: US 11,117,446 B2
(45) Date of Patent: Sep. 14, 2021

(54) BLOWER DEVICE

(71) Applicant: DENSO CORPORATION, Kariya (JP)

(72) Inventors: Ayaka Tomido, Kariya (JP); Sho Kosaka, Kariya (JP)

(73) Assignee: DENSO CORPORATION, Kariya (JP)

( * ) Notice: Subject to any disclaimer, the term of this patent is extended or adjusted under 35 U.S.C. 154(b) by 84 days.

(21) Appl. No.: 16/563,432

(22) Filed: Sep. 6, 2019

(65) Prior Publication Data

US 2019/0389278 A1 Dec. 26, 2019

Related U.S. Application Data

(63) Continuation of application No. PCT/JP2018/013174, filed on Mar. 29, 2018.

(30) Foreign Application Priority Data

Apr. 11, 2017 (JP) .............................. JP2017-078187

(51) Int. Cl.
*B60H 1/32* (2006.01)
*B60H 1/00* (2006.01)

(52) U.S. Cl.
CPC ............ *B60H 1/32* (2013.01); *B60H 1/0055* (2013.01); *B60H 2001/3255* (2013.01)

(58) Field of Classification Search
CPC .... B60H 1/32; B60H 1/0055; B60H 1/00564; B60H 1/00028; B60H 1/00064; B60H 2001/3255; B60H 2001/00135; B60H 2001/006; F24F 13/24
See application file for complete search history.

(56) References Cited

U.S. PATENT DOCUMENTS

| 6,019,288 A * | 2/2000 | Arold ................ B60H 1/00064 165/204 |
| 6,192,698 B1* | 2/2001 | Kakehashi ......... B60H 1/00064 165/203 |
| 2010/0043470 A1* | 2/2010 | Kang ................. B60H 1/00064 62/239 |
| 2011/0200426 A1 | 8/2011 | Takano |
| 2011/0255953 A1 | 10/2011 | Smeulers |
| 2014/0166392 A1* | 6/2014 | Kye .................... F01N 13/1894 181/226 |
| 2015/0107815 A1* | 4/2015 | Hhraguchi ......... B60H 1/00064 165/202 |

FOREIGN PATENT DOCUMENTS

| JP | H07315032 A | 12/1995 |
| JP | 2004301398 A | 10/2004 |
| JP | 2010159046 A * | 7/2010 |
| JP | 2010159046 A | 7/2010 |
| JP | 2011163300 A | 8/2011 |

* cited by examiner

*Primary Examiner* — Emmanuel E Duke
(74) *Attorney, Agent, or Firm* — Harness, Dickey & Pierce, P.L.C.

(57) ABSTRACT

A blower device includes a passage-forming section that forms a passage through which air flows inside. A partition section is provided within the passage-forming section. The partition section divides at least a part of the passage into a first passage and a second passage. The partition section has a hole. The hole passes through the partition section and provides a constant communication between the first passage and the second passage.

11 Claims, 5 Drawing Sheets

BLOWER DEVICE

CROSS REFERENCE TO RELATED APPLICATION

The present application is a continuation application of International Patent Application No. PCT/JP2018/013174 filed on Mar. 29, 2018, which designated the U.S. and claims the benefit of priority from Japanese Patent Application No. 2017-078187 filed on Apr. 11, 2017. The entire disclosures of all of the above applications are incorporated herein by reference.

TECHNICAL FIELD

The present disclosure relates to a blower device.

BACKGROUND ART

A blower device is provided with a noise reduction chamber outside of a passage through which air flows. A noise reduction hole provides a communication between the passage and the noise reduction chamber.

SUMMARY

According to one aspect of this disclosure, a blower device includes: a passage-forming section that forms a passage through which air flows inside; and a partition section provided in the passage-forming section. The partition section divides at least a part of the passage into a first passage and a second passage. The partition section has a hole formed therein. The hole passes through the partition section and provides a constant communication between the first passage and the second passage.

DESCRIPTION OF EMBODIMENTS

Figure 1:
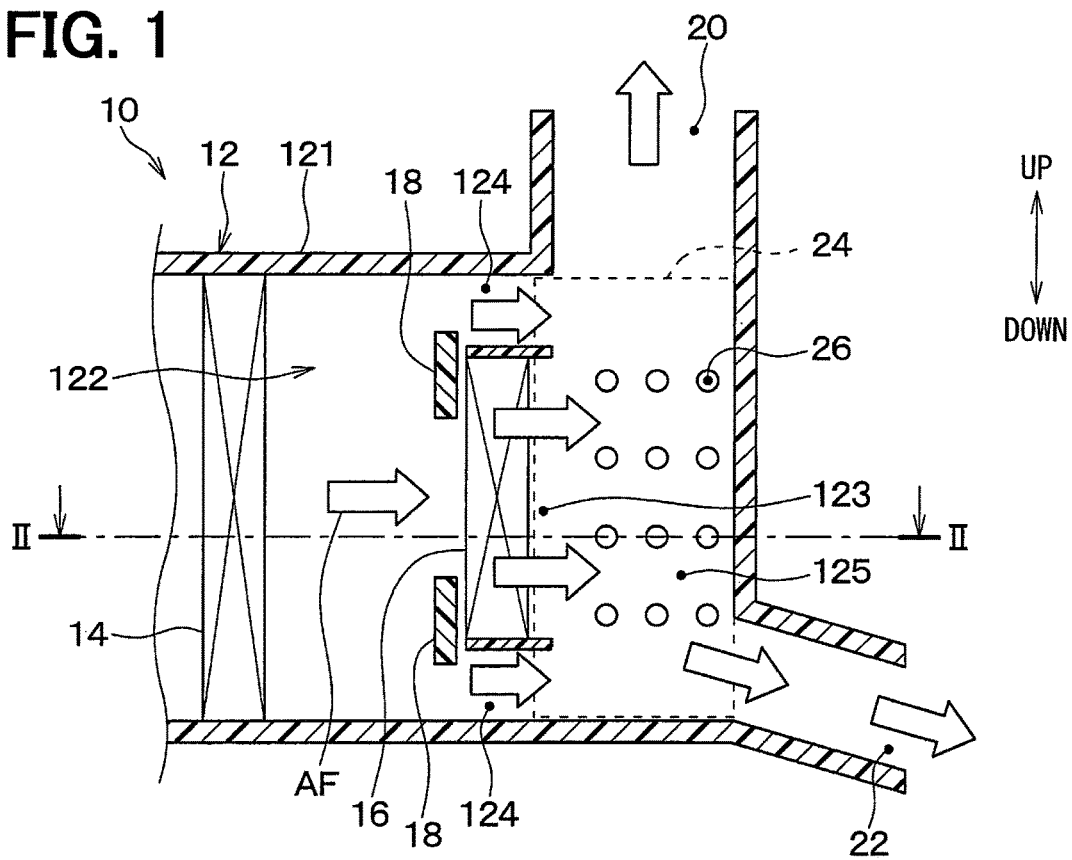
FIG. 1 is a cross section view of an air-conditioning unit according to the first embodiment.

To begin with, examples of relevant techniques will be described.

A blower device is provided with a noise reduction chamber outside of a passage through which air flows. A noise reduction hole provides a communication between the passage and the noise reduction chamber. The noise reduction hole and the noise reduction chamber form Helmholtz resonator. With using a principle of Helmholtz resonator, a ventilation noise is to be reduced.

However, when the noise reduction chamber is outside the passage, the size of the entire device is increased, compared with a device without a noise reduction chamber.

The present disclosure provides a blower device configured so that an increase in the size of the entire device is suppressed and so that noise is reduced.

According to one aspect of this disclosure, a blower device for delivering air includes a passage-forming section that forms a passage through which air flows inside and a partition section provided in the passage-forming section. The partition section divides at least a part of the passage into a first passage and a second passage. The partition section has a hole formed therein. The hole passes through the partition section and provides a constant communication between the first passage and the second passage.

According to this, the first passage and the hole form Helmholtz resonator. Therefore, the noise propagating through the second passage is reduced. Furthermore, the second passage and the hole form Helmholtz resonator. Therefore, the noise propagating through the first passage is reduced. In addition, according to this, Helmholtz resonator is provided inside the passage. Thus, compared with a device in which a noise reduction chamber is outside the passage, an increase in the size of the entire device is suppressed and the noise is reduced.

According to another aspect of this disclosure, a blower device for delivering air includes a passage-forming section that forms a passage thorough which air flows inside and a partition section provided in the passage-forming section. The partition section divides at least a part of the passage into a first passage and a second passage. The partition section has a wall which forms an internal space inside the partition section. A part of the wall facing the first passage has a hole. The hole passes through the part of the wall facing the first passage and provides a constant communication between the first passage and the internal space.

According to this, the internal space of the partition section and the hole form Helmholtz resonator. Thus, the noise propagating through the first passage is to be reduced. In addition, according to this, a noise reduction chamber is not formed outside the passage and Helmholtz resonator is formed inside the passage. Therefore, an increase in the size of the entire device is suppressed and the noise is reduced.

Reference numerals with brackets added to each component element show an example of the correspondent between component elements and concrete component elements described in embodiments mentioned later.

Hereinafter, embodiments will be described according to the drawings. Same or equivalent portions among respective embodiments below are labeled with the same reference numerals in the drawings.

First Embodiment

The blower device in this embodiment is an air-conditioning unit 10 for a vehicle 1. The air-conditioning unit 10 is installed in front of a front seat inside a cabin 2 of the vehicle 1. The air-conditioning unit 10 blows out temperature conditioned air to the cabin 2.

Figure 2:
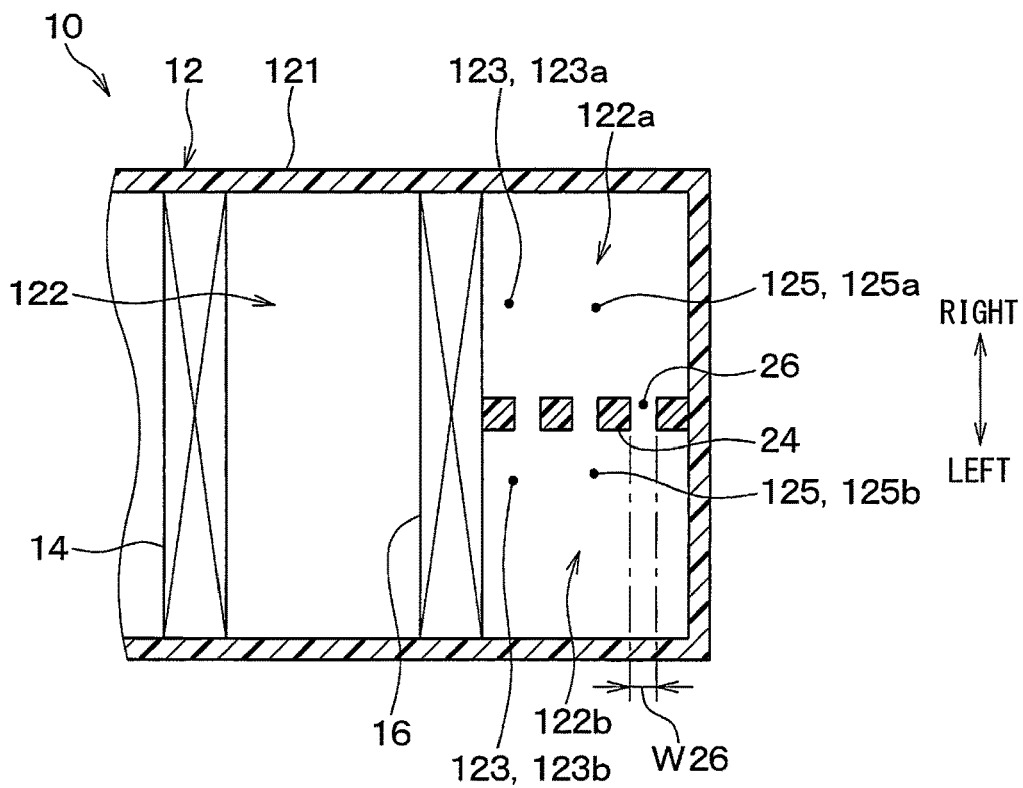
FIG. 2 is a cross section view taken along with the line II-II of FIG. 1.
Figure 3:
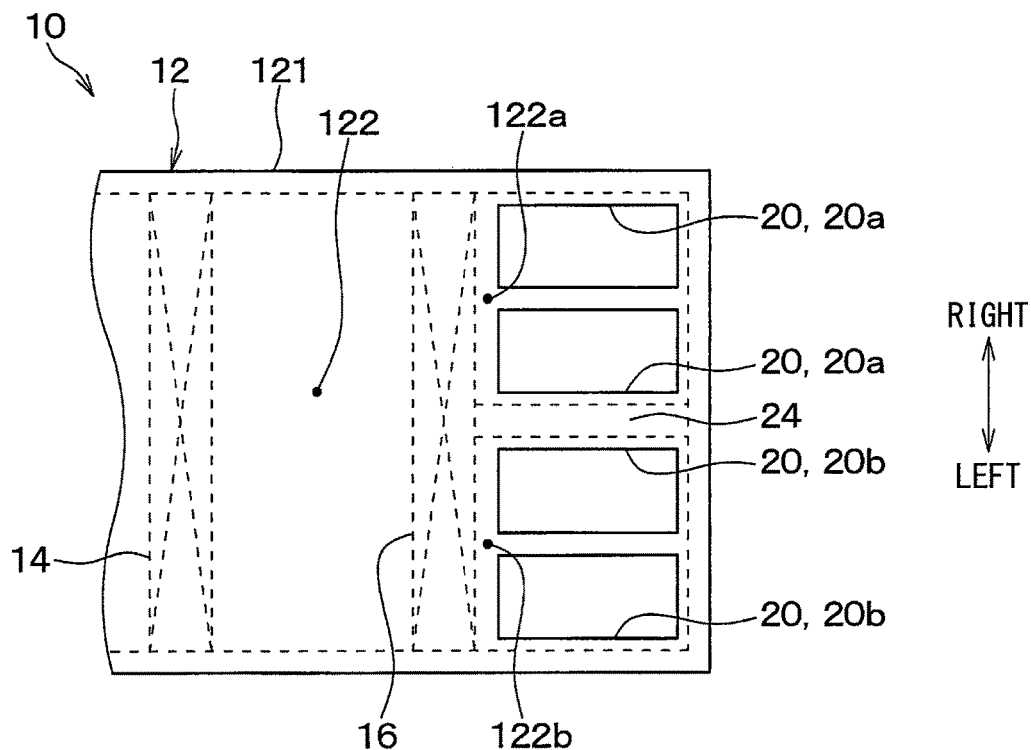
FIG. 3 is a top view of the air-conditioning unit in FIG. 1.
Figure 9:
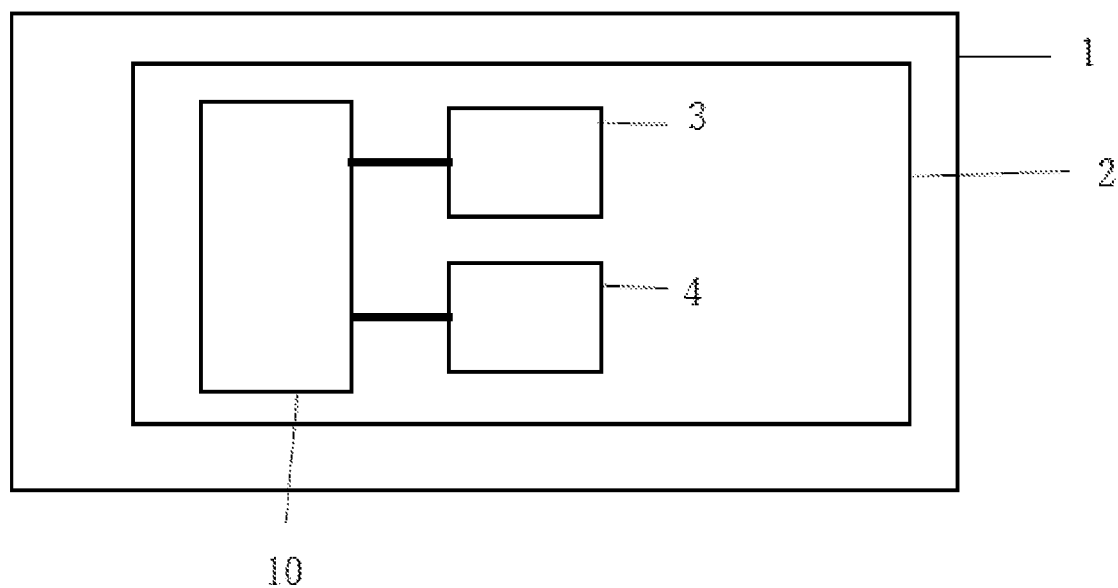
FIG. 9 is a schematic illustration of an exemplary vehicle cabin in accordance with the present disclosure.

FIG. 9 schematically illustrates an exemplary vehicle cabin in accordance with the present disclosure. As illustrated in FIGS. 1, 2 and 3, the air-conditioning unit 10 includes an air-conditioning case 12, an evaporator 14, a heater core 16 and an air mix door 18.

The air-conditioning case 12 is in front of the front seat inside of the cabin 2. An air passage 122 is formed inside a case component 121 of the air-conditioning case 12. An air AF flows in the air passage 122 to the cabin 2. Therefore, the air-conditioning case 12 is the passage-forming section to form a passage through which air flows inside.

The air-conditioning case 12 houses the evaporator 14, the heater core 16 and the air mix door 18 inside.

The evaporator 14 is an air cooling heat exchanger to evaporate a refrigerant and to cool air by a heat exchange with the refrigerant in refrigeration cycle.

The air passage 122 includes a warm air passage 123, a cool air passage 124 and an air mix part 125. The warm air heated at the heater core 16 flows in the warm air passage 123. In the cool air passage 124, the cool air cooled at the evaporator 14 bypasses the heater core 16. At the air mix part 125, the warm air from the warm air passage 123 and the cool air from the cool air passage 124 are mixed.

The air mix door 18 regulates the air flow ratio of the warm air through the warm air passage 123 and the cool air through the cool air passage 124. By regulating the air flow ratio of the warm air and the cool air, the temperature of the conditioned air mixed at the air mix part 125 is regulated. Therefore, the evaporator 14, the heater core 16 and the air mix door 18 comprise a temperature regulation system to regulate the temperature of the air AF to the cabin 2.

Plural openings 20 and 22 are formed at the air flow downstream side in the air-conditioning case 12. Each of the openings 20, 22 is connected to each of air outlets placed in the cabin 2. As illustrated in FIG. 1, the openings 20 and 22 include a face opening 20, a foot opening 22 and a defroster opening. The illustration of the defroster opening is omitted in FIGS. 1 and 3.

The openings 20 and 22 are divided into a driver seat side opening and a passenger seat side opening. The driver seat side opening is connected to an air outlet for a driver seat 3 in the cabin 2. The passenger seat opening is connected to an air outlet for a passenger seat 4 in the cabin 2 as generally illustrated for example in FIG. 9.

To be concrete, as illustrated in FIG. 3, the face opening 20 includes a driver side face opening 20a and a passenger side face opening 20b. The driver side face opening 20a is connected to a face air outlet placed at the driver seat side in the cabin 2. The passenger side face opening 20b is connected to a face air outlet placed at the passenger seat side in the cabin 2.

Not illustrated in figures, the foot opening 22 includes a driver foot opening for the driver seat 3 and a passenger foot opening for the passenger seat 4. The driver foot opening is connected to a foot air outlet placed at the driver seat side in the cabin 2. The passenger foot opening is connected to a foot air outlet placed at the passenger seat side in the cabin 2.

The air-conditioning unit 10 has a blowing mode door which is not described in figures. The blowing mode door opens or closes the openings 20 and 22 selectively. With the blowing mode door, each blowing mode such as a face mode and a foot mode is selected.

As illustrated in FIGS. 1, 2 and 3, the air-conditioning unit 10 has a left and right partition wall 24 placed inside the air-conditioning case 12. The left and right partition wall 24 regulates the temperature of the conditioned air from the air outlet for the driver seat 3 and the passenger seat 4 independently. The left and right partition wall 24 is placed downstream of the heater core 16 in the air flow, inside the air-conditioning case 12.

As illustrated in FIG. 3, the left and right partition wall 24 divides a part of the air passage 122 into a driver seat side passage 122a and a passenger seat side passage 122b. The driver seat side passage 122a is a passage connected to the driver seat side opening such as the driver side face opening 20a. The passenger seat side passage 122b is a passage connected to the passenger seat side opening such as the passenger side face opening 20b.

To be concrete, as illustrated in FIG. 2, the left and right partition wall 24 divides the warm air passage 123 into a warm air passage 123a for the driver seat 3 and a warm air passage 123b for the passenger seat 4. The left and right partition wall 24 divides the air mix part 125 into an air mix part 125a for the driver seat 3 and an air mix part 125b for the passenger seat 4. Not illustrated in the figures, the left and right partition wall 24 divides the cool air passage 124 into a cool air passage for the driver seat 3 and a cool passage for the passenger seat 4. The warm air passage 123a, the cool air passage and the air mix part 125a for the driver seat side comprise the driver seat side passage 122a. The warm air passage 123b, the cool air passage and the air mix part 125b for the passenger seat 4 comprise the passenger seat side passage 122b.

Therefore, the left and right partition wall 24 is a partition section which divides at least a part of the passage 122 inside the air-conditioning case 12 into the first passage and the second passage. The driver seat side passage and the passenger seat side passage correspond to the first passage and the second passage respectively.

As illustrated in FIGS. 1 and 2, the left and right partition wall 24 has plural holes 26. Each of the holes 26 passes through the left and right partition wall 24 and provides a constant communication between the driver seat side passage 122a and the passenger seat side passage 122b. Each shape of the holes 26 is circle. The holes 26 are arranged regularly in some lines. Each size of the holes 26 is the same. The holes 26 reduce a noise as described below. Each size of the holes 26 is adjusted to be able to reduce the noise. To be concrete, each opening width W26 of the holes 26 is larger than 0 and smaller than or equal to 1 mm.

A shape of the holes 26 may be other shapes except circle, for example, a polygon. Each shape of the all or a part of the holes may be the same. In addition, each shape of the all holes may be different. A placement of the holes 26 is not limited to the placement illustrated in FIGS. 1 and, 2. The holes 26 may be arranged randomly.

According to this embodiment, the driver seat side passage 122a and the holes 26 form Helmholtz resonator. Therefore, the noise propagating through the passenger seat side passage 122b is reduced. In the same way, the passenger seat side passage 122b and the holes 26 form Helmholtz resonator. Therefore, the noise propagating through the driver seat side passage 122a is reduced. The noise may be an aerodynamic noise and a motor vibration noise of a blower device which is not illustrated in the figures.

In this embodiment, Helmholtz resonator is formed, in which a back air layer is provided by one of the driver seat side passage 122a and the passenger seat side passage 122b, relative to the other of the driver seat side passage 122a and the passenger seat side passage 122b. Therefore, the noise propagating through the air-conditioning case 12 is reduced.

Figure 4:
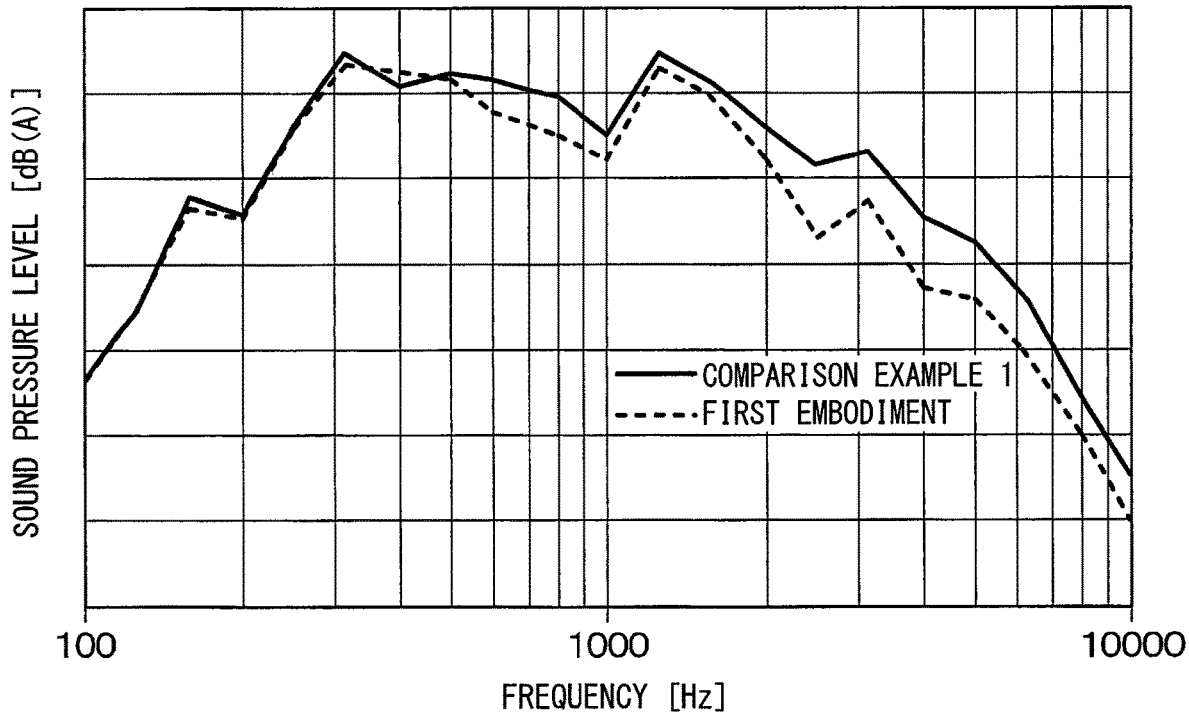
FIG. 4 is a sound pressure level of the air-conditioning unit of the first embodiment and an air-conditioning unit of comparison example 1.

The sound pressure level of the air-conditioning unit 10 in this embodiment and an air-conditioning unit in a comparison example 1 are shown in FIG. 4. The air-conditioning unit in the comparison example 1 differs from the air-conditioning unit 10 in this embodiment at the point that the left and right partition wall 24 does not have the holes 26.

The blowing mode of this measurement is a face mode that the conditioned air is blown out from the face air outlet both of the driver seat side and the passenger seat side. From FIG. 4, with using the air-conditioning unit 10 of this embodiment, the sound pressure level is suppressed in a wide range of the frequency compared to the air-conditioning unit in the comparison example 1. To say, the noise is reduced.

According to this embodiment, as the measurement results in FIG. 4, the noise reduction effect is observed in the case that air flows through both of the driver seat side passage 122a and the passenger seat side passage 122b. Therefore, air flowing through one of the driver seat side passage 122a and the passenger seat side passage 122b acts as a spring against air flowing through the other of the driver seat side passage 122a and the passenger seat side passage 122b. Therefore, Helmholtz resonator is formed. The air flowing through one passage resonates, so that the noise propagating through the other passage is reduced.

In the case that either air outlet for the driver seat 3 or the passenger seat 4 is closed and that either passage of the driver seat side or the passenger seat side is closed, Helmholtz resonator is formed as described above. Therefore, also in this case, the noise propagating through the air-conditioning case 12 is reduced.

Furthermore, according to this embodiment, Helmholtz resonator is formed inside the passage of the air-conditioning unit 10. The noise reduction chamber to reduce the noise is not formed outside the passage of the air-conditioning unit 10. Therefore, compared with the device which has the noise reduction chamber outside the passage, the increase of the size in the entire device is suppressed and the noise is reduced.

According to this embodiment, the left and right partition wall 24 regulates the temperature of the conditioned air through the driver seat side passage 122a and the passenger seat side passage 122b independently. The left and right partition wall 24 has the holes 26. Therefore, another partition wall to reduce the noise is not needed.

Second Embodiment

The blower device in this embodiment is an air-conditioning unit. In this embodiment, the placement of a partition section differs from the first embodiment.

Figure 5:
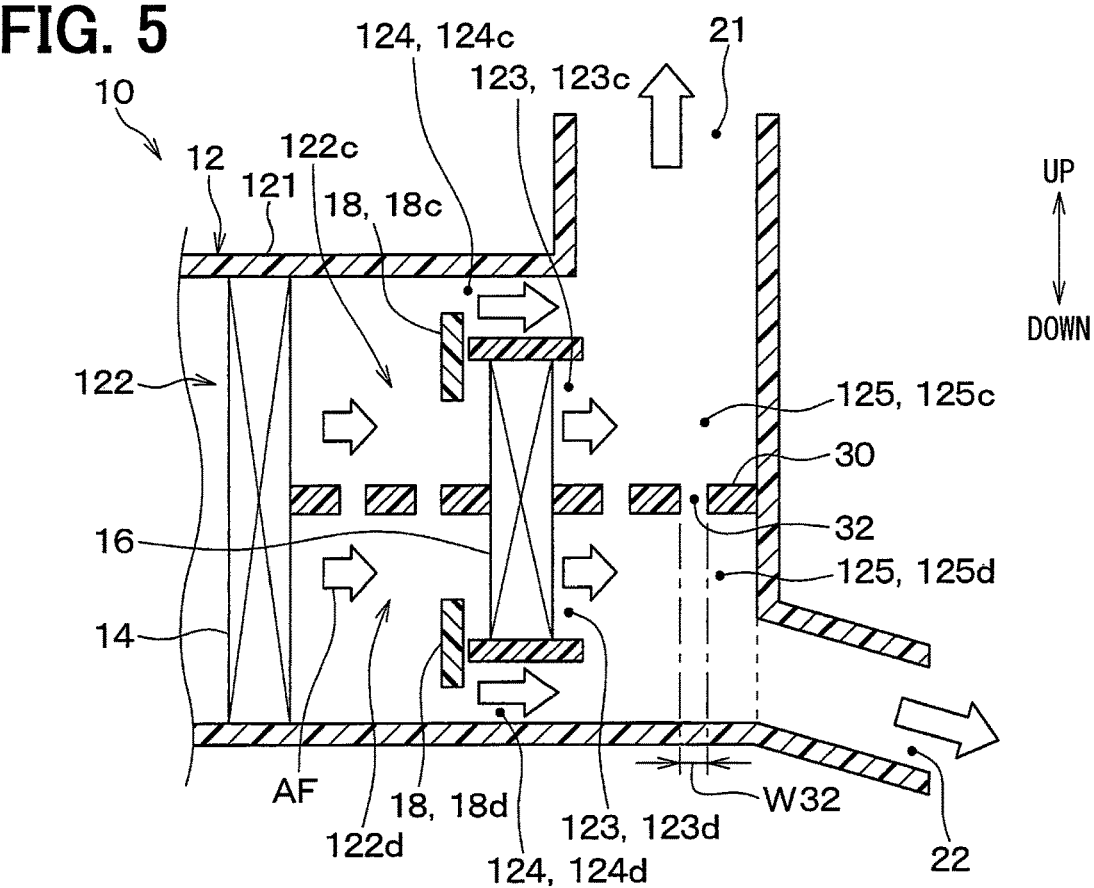
FIG. 5 is a cross section view of an air-conditioning unit in the second embodiment

As illustrated in FIG. 5, the air-conditioning unit 10 has an up and down partition wall 30 inside the air-conditioning case 12. The up and down partition wall 30 is placed between the evaporator 14 and the heater core 16 and also placed downstream side of the heater core 16 in the air-conditioning case 12.

The up and down partition wall 30 divides a part of the passage 122 into an upper passage 122c and a lower passage 122d. The upper passage 122c is a passage connected to the defroster opening 21 and the face opening. The defroster opening 21 and the face opening are an upper opening placed upper side of the air-conditioning case 12. In FIG. 5, the illustration of the face opening is omitted. The lower passage 122d is a passage connected to the foot opening 22. The foot opening is placed at lower part of the air-conditioning case 12.

To be concrete, the up and down partition wall 30 divides a warm air passage 123 into an upper warm air passage 123c and a lower warm air passage 123d. The up and down partition wall 30 divides the air mix part 125 into an upper air mix part 125c and a lower air mix part 125d. The upper warm air passage 123c and the upper air mix part 125c form a part of the upper passage 122c. The lower warm air passage 123d and the lower air mix part 125d form a part of the lower passage 122d.

Therefore, the up and down partition wall 30 is a partition section to divide at least a part of the passage inside the air-conditioning case 12 into a first passage and a second passage. The upper passage 122c and the lower passage 122d correspond to the first passage and the second passage respectively.

The upper passage 122c includes an upper cool air passage 124c placed upper side of the heater core 16. The upper passage 122c has an upper air mix door 18c. The upper air mix door 18c regulates the temperature of the conditioned air mixed at the upper air mix part 125c.

The lower passage 122d includes a lower cool air passage 124d placed at the lower side of the heater core 16. The lower passage 122d has an air mix door 18d. The lower air mix door 18d regulates the temperature of the conditioned air mixed at the lower air mix part 125d.

A dry outside air flows through the upper passage 122c. The air flowing through the upper passage 122c is blown out from the defroster air outlet and the face air outlet in the cabin 2. According to this, fogging on a windshield is suppressed. On the other hand, the warm inside air flows through the lower passage 122d. The air through the lower passage 122d is blown out from the foot air outlet in the cabin 2. According to this, the heating efficiency is improved compared with a case where the cool outside air is heated.

The up and down partition wall 30 has holes 32. Each of the holes 32 passes through the up and down partition wall 30 and provides a constant communication between the upper passage 122c and the lower passage 122d. Each opening width W32 of the holes 32 is larger than 0 and smaller than or equal to 1 mm. The shape, the size and the placement of the holes 32 are the same with the holes in the first embodiment.

According to this embodiment, the upper passage 122c and the holes 32 form Helmholtz resonator. Therefore, the noise propagating through the lower passage 122d is reduced. In the same way, the lower passage 122d and the holes 32 form Helmholtz resonator. Therefore, the noise propagating through the upper passage 122c is reduced. According to this embodiment, Helmholtz resonator is formed inside the air-conditioning unit 10. Thus, the same effect with the first embodiment is obtained.

According to this embodiment, the up and down partition wall 30 is placed so that the outside air flows through the upper passage 122c and the inside air flows through the lower passage 122d. The up and down partition wall 30 has the holes 32. Therefore, another partition wall to reduce noise is not needed.

Third Embodiment

Figure 6:
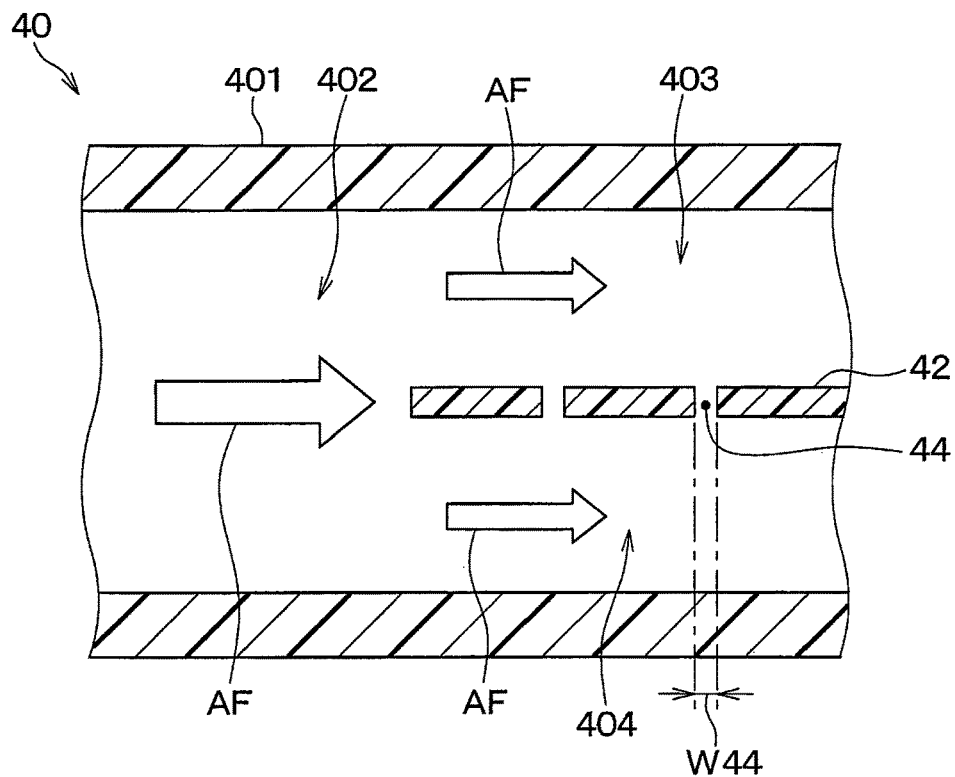
FIG. 6 is a cross section view of a duct in the third embodiment.

As illustrated in FIG. 6, a blower device in this embodiment is a duct 40 connected to an air-conditioning unit for a vehicle 1.

The duct 40 is equipped in the vehicle 1. The duct component part 401 of the duct 40 forms an air passage 402. An air AF flows through the air passage 402 from the air-conditioning unit to a cabin 2 of the vehicle 1. Thus, the duct 40 is a passage-forming section to form the passage through which air flows inside.

The duct 40 has a partition wall 42 inside the duct 40. The partition wall 42 is installed to reduce a noise. The partition wall 42 is placed in a part or all range of the duct 40 in the flow direction. The partition wall 42 divides a part or all parts of the air passage 402 into a duct first passage 403 and a duct second passage 404. Therefore, the partition wall 42 is a partition section to divide at least a part of the passage inside the duct 40 into a first passage and a second passage. The duct first passage 403 corresponds to the first passage. The duct second passage 404 corresponds to the second passage.

According to this embodiment, the partition wall 42 has holes 44. Each of the holes 44 passes through the partition wall 42 and provides a constant communication between the duct first passage 403 and the duct second passage 404. Each opening width W44 of the holes 44 is larger than 0 and smaller than or equal to 1 mm. Each shape, size and placement of the holes is the same with those in the first embodiment.

According to this embodiment, the duct first passage 403 and the holes 44 form Helmholtz resonator. Therefore, the noise propagating through the duct second passage 404 is reduced. In the same way, the duct second passage 404 and the holes 44 form Helmholtz resonator. Therefore, the noise propagating through the duct first passage 403 is reduced. According to this embodiment, Helmholtz resonator is formed inside the passage of the duct 40. Therefore, the same effect with the first embodiment is obtained.

Fourth Embodiment

In this embodiment, the structure of the left and right partition wall 24 is changed from the first embodiment.

Figure 7:
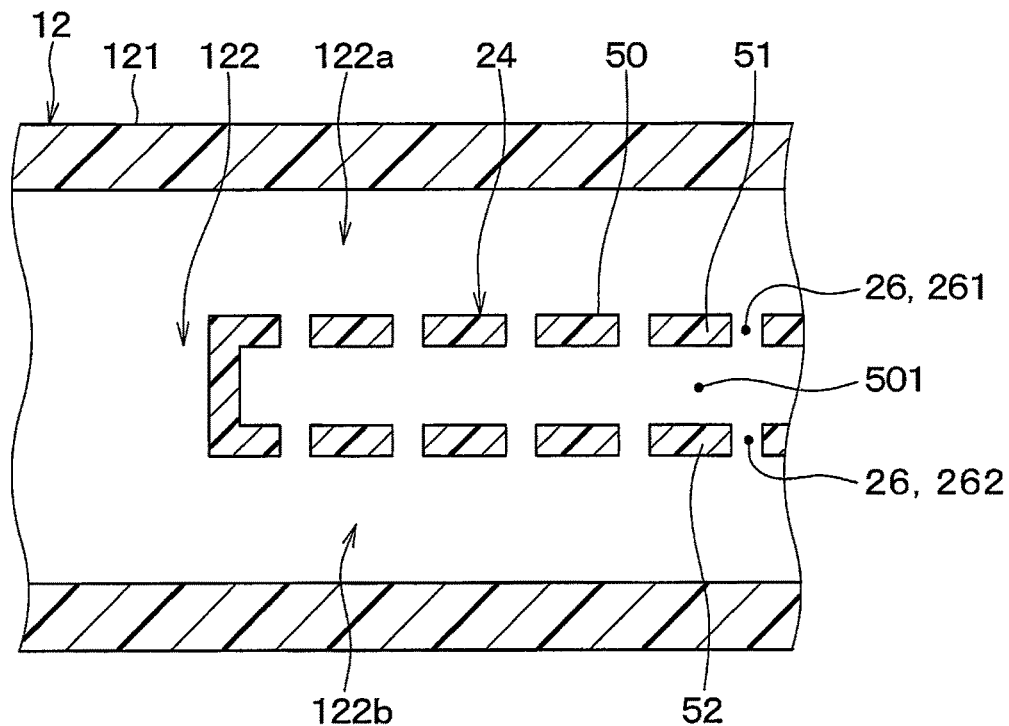
FIG. 7 is a cross section view of a part of an air-conditioning unit in the fourth embodiment.

As illustrated in FIG. 7, in this embodiment, the left and right partition wall 24 has a wall part 50. The wall part 50 forms an inner space 501 inside the partition wall 24. The inner space 501 is enclosed by the wall part 50. The wall part 50 has the first passage part 51 facing the driver seat side passage 122a and the second passage part 52 facing the passenger seat side passage.

Each of the holes 26 passes through both of the first passage part 51 and the second passage part 52. Each of the holes 26 provides a constant communication between the driver seat side passage 122a and the passenger seat side passage 122b through the inner space 501.

Each of the holes 26 includes a first passage side hole 261 and a second passage side hole 262. The first passage side hole 261 is formed in the first passage part 51. The second passage side hole 262 is formed in the second passage part 52.

According to this embodiment, the driver seat side passage 122a, the first passage side hole 261, the inner space 501 and the second passage side hole 262 form Helmholtz resonator. Therefore, the noise propagating through the passenger seat side passage 122b is reduced. In the same way, the passenger seat side passage 122b, the second passage side hole 262, the inner space 501 and the first passage side hole 261 form Helmholtz resonator. Therefore, the noise propagating through the driver seat side passage 122a is reduced.

Furthermore, according to this embodiment, the inner space 501 and the first passage side hole 261 form Helmholtz resonator. The noise propagating through the driver seat side passage 122a is reduced. In the same way, the inner space 501 and the second passage side hole 262 form Helmholtz resonator. The noise propagating through the passenger seat side passage 122b is reduced.

Fifth Embodiment

In this embodiment, the structure of the left and right partition wall 24 is changed from the first embodiment.

Figure 8:
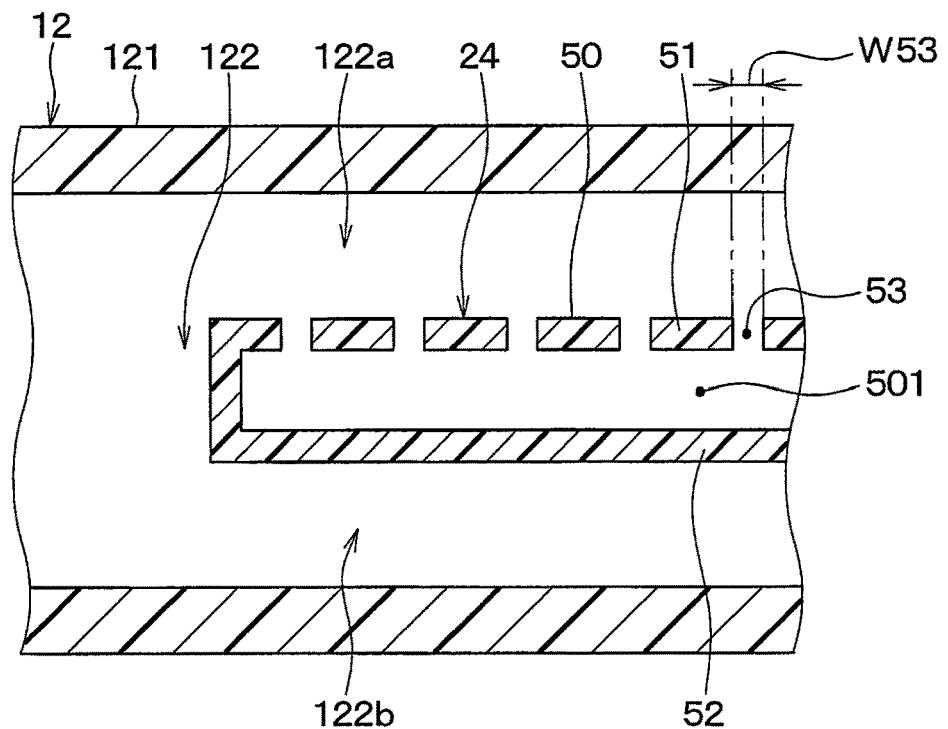
FIG. 8 is a cross section view of a part of an air-conditioning unit in the fifth embodiment.

As illustrated in FIG. 8, in this embodiment, in the same way with the fourth embodiment, the left and right partition wall 24 has a wall part 50. The wall part 50 forms an inner space 501 inside the left and right partition wall 24.

In this embodiment, plural holes 53 are formed only in the first passage part 51, and are not formed in the second passage part 52 of the wall part 50. Each of the holes 53 passes through the first passage part 51 and provides a constant communication between the driver seat side passage 122a and the inner space 501. The holes 53 are formed to reduce a noise. Each size of the holes is adjusted to reduce the noise. To be concrete, each opening width W53 of the holes 53 is larger than 0 and smaller than or equal to 1 mm. Each shape, size and placement of the holes is the same with those in the first embodiment.

According to this embodiment, the inner space 501 and the holes 26 form Helmholtz resonator. Thus, the noise propagating through the driver seat side passage 122a is reduced. Furthermore, according to this embodiment, Helmholtz resonator is formed inside the air-conditioning unit 10 as with the first embodiment. Therefore, the same effect with the first embodiment is obtained.

In this embodiment, the holes 53 is formed only on the first passage part 51 of the first passage part 51 and the second passage part 52 of the wall part 50. However, the holes 53 may be formed only on the second passage part 52 of the first passage part 51 and the second passage part 52 of the wall part 50. Therefore, the noise propagating through the passenger seat side passage 122b is to be reduced.

Other Embodiment (1) The holes 26, 32, 44, 261 and 262 are plural in each embodiment described above. However, the hole may be one.

(2) In the fourth embodiment, the left and right partition wall 24 of the air-conditioning unit 10 has the wall part 50. The wall part 50 has the hole 261 on the first passage side and on the hole 262 on the second passage side. The up and down partition wall 30 in the second embodiment and the partition wall 42 in the third embodiment may have the wall part 50 having the hole 261 on the first passage side and the hole 262 on the second passage side.

(3) In the fifth embodiment, the left and right partition wall 24 of the air-conditioning unit 10 has the wall part 50 which has the holes 53. The up and down partition wall 30 in the second embodiment and the partition wall 42 in the third embodiment may have the wall part 50 which has the holes 53.

(4) In the first, second, fourth, and fifth embodiment, the air-conditioning unit 10 is in front of the front seat in the cabin 2. However, the air-conditioning unit 10 may be other places in the cabin 2. The other places in the cabin 2 may be an area around a back seat and an inside of a seat. In any case, the air-conditioning unit has at least the air-conditioning case which produces a passage to the cabin 2 and a partition section therein.

(5) In each embodiment above, the blower device in this disclosure is applied to the air-conditioning unit or the duct which is connected to the air-conditioning unit. However, the blower device in this disclosure may be applied to other blower devices which have a passage-forming section and a partition section inside the passage-forming section.

It should be appreciated that the present disclosure is not limited to the embodiments described above and can be modified appropriately within the scope of the appended claims. The present disclosure includes various examples of modification and modification in the range of equivalence. The embodiments above are not irrelevant to one another and can be combined appropriately unless a combination is obviously impossible. In the respective embodiments above, it goes without saying that elements forming the embodiments are not necessarily essential unless specified as being essential or deemed as being apparently essential in principle. In a case where a reference is made to the components of the respective embodiments as to numerical values, such as the number, values, amounts, and ranges, the components are not limited to the numerical values unless specified as being essential or deemed as being apparently essential in principle. Also, in a case where a reference is made to the components of the respective embodiments above as to materials, shapes and positional relations, the components are not limited to the materials, the shapes and the positional relations unless explicitly specified or limited to particular materials, shapes and positional relations in principle.

SUMMARY

From the first aspect described in a part or all of the respective embodiments above, the blower device has a passage forming section and a partition section. The partition section divides at least a part of the passage into a first passage and a second passage. The partition section has a hole. The hole passes through the partition section and provides a constant communication between the first passage and the second passage.

From the second aspect, the blower device is an air-conditioning unit for a vehicle 1. The air-conditioning unit has a temperature regulation system to regulate a temperature of air to a cabin 2 of the vehicle 1. The passage-forming section is the air-conditioning case which forms the passage through which air flows into the cabin 2. The air-conditioning case has the temperature regulation system inside the passage-forming section.

Therefore, the bower device in the first aspect is applied to an air-conditioning unit.

Also, from the third aspect, the air-conditioning case has a driver seat side opening which is connected to an air outlet for the driver seat 3 and a passenger seat side opening which is connected to an air outlet for the passenger seat 4. The partition section divides the first passage connected to the driver seat side opening from the second passage connected to the passenger seat side opening.

In the case that an air-conditioning unit has a partition section described above, a hole can be formed in the partition section. Therefore, another partition section to reduce a noise is not needed.

From the fourth aspect, the air-conditioning case has a defroster opening connected to a defroster air outlet and a foot opening connected to a foot air outlet in a cabin 2. The partition section divides the first passage connected to the defroster opening from the second passage connected to the foot opening. The second passage is placed below the first passage.

In the case of the air-conditioning unit has the partition section described above, a hole can be formed in the partition section. Therefore, another partition section to reduce a noise is not needed.

From the fifth aspect, the partition section has a wall which forms an inner space therein. The hole passes through both of a part of the wall facing the first passage and a part of the wall facing the second passage. The hole provides a constant communication between the first passage and the second passage through the inner space.

The partition section in the fifth aspect can be used in the first to fourth aspects.

According to the sixth aspect, the blower device has a passage-forming section and a partition section. The partition section divides at least a part of the passage into a first passage and a second passage. The partition section has a wall which forms an inner space inside the partition section. A hole is formed on a part of the wall facing to the first passage. The hole passes through the part of the wall facing the first passage and provides a constant communication between the first passage and the inner space.

According to the seventh aspect, the opening width of the hole is larger than 0 and smaller than or equal to 1 mm. The concrete size of the hole in the first to sixth aspects may be the same size described in the seventh aspect.

What is claimed is:

1. A blower device for delivering air comprising: a passage-forming section that forms a passage through which the air flows inside; and a partition section provided within the passage-forming section, wherein the partition section divides at least a part of the passage into a first passage and a second passage, the partition section has a hole, the hole passes through the partition section and provides a constant communication between the first passage and the second passage, the partition section has a wall which forms an inner space inside the partition section, the wall encloses the inner space, the hole passes through both of a part of the wall facing the first passage and a part of the wall facing the second passage, and the hole provides a constant communication between the first passage and the second passage.

2. The blower device according to claim 1, wherein
the blower device is an air-conditioning unit for a vehicle, the air-conditioning unit having a temperature regulation system to regulate a temperature of air to a cabin of the vehicle,
the passage-forming section is an air-conditioning case having the temperature regulation system inside the passage, and
the air-conditioning case forms the passage through which the air flows into the cabin.

3. The blower device according to claim 2, wherein
the air-conditioning case has
a driver seat opening connected to an air outlet for a driver seat in the cabin, and
a passenger seat opening connected to an air outlet for a passenger seat in the cabin, and
the partition section divides the first passage connected to the driver seat opening from the second passage connected to the passenger seat opening.

4. The blower device according to claim 2, wherein
the air-conditioning case has
a defroster opening connected to a defroster air outlet in the cabin, and
a foot opening connected to a foot air outlet in the cabin,
the partition section divides the first passage connected to the defroster opening from the second passage connected to the foot opening, and
the second passage is positioned below the first passage.

5. The blower device according to claim 1, wherein
the hole has an opening width larger than 0 and smaller than or equal to 1 mm.

6. The blower device according to claim 1, wherein
the wall has a first part and a second part opposing to each other, and a connecting part that connects an end of the first part to an end of the second part to form the inner space.

7. The blower device according to claim 6, wherein
a position of the hole passing through the first part corresponds to a position of the hole passing through the second part.

8. The blower device according to claim 1, wherein the wall has a longitudinal direction that is parallel to an airflow direction.

9. A blower device for delivering air comprising: a passage-forming section that forms a passage through which the air flows inside; and a partition section provided within the passage-forming section, wherein the partition section divides at least a part of the passage into a first passage and a second passage, the partition section has a wall which forms an inner space inside the partition section, the wall encloses the inner space, the wall divides at least a part of the passage into a first passage and a second passage, a part of the wall facing the first passage has a hole, and the hole passes through the part of the wall facing the first passage and provides a constant communication between the first passage and the inner space.

10. The blower device according to claim 9, wherein the wall has a first part and a second part opposing to each other, and a connecting part that connects an end of the first part to an end of the second part to form the inner space.

11. The blower device according to claim 9, wherein the wall has a longitudinal direction that is parallel to an airflow direction.

* * * * *